US011989799B2

(12) United States Patent
Inoue et al.

(10) Patent No.: US 11,989,799 B2
(45) Date of Patent: May 21, 2024

(54) VISUALIZED IMAGE DISPLAY DEVICE

(71) Applicant: NEC Corporation, Tokyo (JP)

(72) Inventors: Keiko Inoue, Tokyo (JP); Takashi Shibata, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/789,962

(22) PCT Filed: Jan. 10, 2020

(86) PCT No.: PCT/JP2020/000757
§ 371 (c)(1),
(2) Date: Jun. 29, 2022

(87) PCT Pub. No.: WO2021/140669
PCT Pub. Date: Jul. 15, 2021

(65) Prior Publication Data
US 2022/0375138 A1   Nov. 24, 2022

(51) Int. Cl.
*G06T 11/00*   (2006.01)
*G06V 10/62*   (2022.01)
(Continued)

(52) U.S. Cl.
CPC .............. *G06T 11/00* (2013.01); *G06V 10/62* (2022.01); *G06V 10/764* (2022.01); *G06V 20/46* (2022.01); *G06V 20/70* (2022.01)

(58) Field of Classification Search
CPC ........ G06T 11/00; G06V 20/70; G06V 20/46; G06V 10/62; G06V 10/764
See application file for complete search history.

(56) References Cited

U.S. PATENT DOCUMENTS

2009/0080698 A1* 3/2009 Mihara ................ G06T 11/206
382/103
2009/0119583 A1* 5/2009 Kihara ................... G06F 16/40
715/273
(Continued)

FOREIGN PATENT DOCUMENTS

JP   2016-049055 A   4/2016
JP   2019-003329 A   1/2019
(Continued)

OTHER PUBLICATIONS

International Search Report for PCT Application No. PCT/JP2020/000757, dated Mar. 3, 2020.

*Primary Examiner* — Yu Chen
(74) *Attorney, Agent, or Firm* — Sughrue Mion, PLLC

(57) ABSTRACT

A visualized image display device includes an acquisition means for acquiring time-series feature data in which time-series data of a feature of an object in a video and an object ID are associated with each other, and classification data in which the object ID and a class ID labeled to the object are associated with each other; a selection means for selecting a class ID to be visualized, and a display control means for acquiring the object ID associated with the selected class ID from the classification data, acquiring time-series data associated with the acquired object ID from the time-series feature data, and on the basis of the acquired time-series data, displaying a feature image representing a temporal change of the feature of the object having the selected class ID, on a display unit.

12 Claims, 8 Drawing Sheets

(51) Int. Cl.
*G06V 10/764* (2022.01)
*G06V 20/40* (2022.01)
*G06V 20/70* (2022.01)

(56) References Cited

U.S. PATENT DOCUMENTS

| | | | | |
|---|---|---|---|---|
| 2010/0027892 | A1* | 2/2010 | Guan | G06V 10/7515 |
| | | | | 382/203 |
| 2011/0044498 | A1* | 2/2011 | Cobb | G06T 11/206 |
| | | | | 382/103 |
| 2012/0013805 | A1* | 1/2012 | Mihara | H04N 21/4828 |
| | | | | 348/569 |
| 2016/0117827 | A1* | 4/2016 | Bae | G06V 20/52 |
| | | | | 382/103 |
| 2018/0246846 | A1* | 8/2018 | Takimoto | G06F 15/76 |
| 2019/0012621 | A1* | 1/2019 | Kudo | G06Q 10/06395 |
| 2019/0392589 | A1* | 12/2019 | Hirakawa | G06V 20/52 |
| 2020/0272850 | A1* | 8/2020 | Sakai | G06F 18/29 |

FOREIGN PATENT DOCUMENTS

| | | |
|---|---|---|
| JP | 2019-040335 A | 3/2019 |
| WO | 2018/180040 A1 | 10/2018 |

* cited by examiner

VISUALIZED IMAGE DISPLAY DEVICE

This application is a National Stage Entry of PCT/JP2020/000757 filed on Jan. 10, 2020, the contents of all of which are incorporated herein by reference, in their entirety.

TECHNICAL FIELD

The present invention relates to a visualized image display device, a visualized image display method, and a storage medium.

BACKGROUND ART

A technology of visualizing a temporal change of a feature (position or the like) of an object appearing in a video has been proposed conventionally.

For example, in Patent Literature 1, a moving locus that is a temporal change of a position of an object in a video is synthesized in the background image and is shown on a display unit. Further, in Patent Literature 1, loci of two or more objects are displayed on one background image. Furthermore, in Patent Literature 1, an object whose locus is to be displayed, items to be displayed by using a locus, and a range of a locus are narrowed down, on the basis of user designation, time or timing used as a basis for elapsed time, the elapsed time from the basis, orientation of an object, a staying period of the object, color of cloths of the object, pattern of the clothes of the object, or a traveling direction of the object.

Meanwhile, art of labelling an object appearing in a video has been proposed conventionally (for example, Patent Literature 2).

Patent Literature 1: WO 2018/180040 A
Patent Literature 2: JP 2019-40335 A

SUMMARY

According to the art of visualizing a temporal change of a feature of an object appearing in a video as described above, it is possible to visually check the pattern or tendency of a feature of an object appearing along with the lapse of time. Further, according to the art of labelling an object appearing in a video as described above, it is possible to classify objects appearing in the video into some classes.

However, the art of visualizing a temporal change of a feature of an object in a video and the art of labeling an object in the video are not organically associated with each other. Therefore, it is difficult to visually check a temporal change of a feature of an object in a video for each object class.

An object of the present invention is to provide a visualized image display device that solves the problem described above, that is, a problem that it is difficult to visually check a temporal change of a feature of an object in a video for each object class.

A visualized image display device, according to one aspect of the present invention, is configured to include
an acquisition means for acquiring time-series feature data in which time-series data of a feature of an object in a video and an object ID are associated with each other, and classification data in which the object ID and a class ID labeled to the object are associated with each other;
a selection means for selecting a class ID to be visualized; and
a display control means for acquiring the object ID associated with the selected class ID from the classification data, acquiring time-series data associated with the acquired object ID from the time-series feature data, and on the basis of the acquired time-series data, displaying a feature image representing a temporal change of the feature of the object having the selected class ID, on a display unit.

A visualized image display method, according to another aspect of the present invention, is configured to include
acquiring time-series feature data in which time-series data of a feature of an object in a video and an object ID are associated with each other, and classification data in which the object ID and a class ID labeled to the object are associated with each other;
selecting a class ID to be visualized; and
acquiring the object ID associated with the selected class ID from the classification data, acquiring time-series data associated with the acquired object ID from the time-series feature data, and on the basis of the acquired time-series data, displaying a feature image representing a temporal change of the feature of the object having the selected class ID, on a display unit.

A computer-readable storage medium, according to another aspect of the present invention, is configured to store thereon a program for causing a computer to execute processing to
acquire time-series feature data in which time-series data of a feature of an object in a video and an object ID are associated with each other, and classification data in which the object ID and a class ID labeled to the object are associated with each other;
select a class ID to be visualized; and
acquire the object ID associated with the selected class ID from the classification data, acquiring time-series data associated with the acquired object ID from the time-series feature data, and on the basis of the acquired time-series data, display a feature image representing a temporal change of the feature of the object having the selected class ID, on a display unit.

Since the present invention has the configurations as described above, it is possible to visually check a temporal change of a feature of an object in a video for each object class.

EXEMPLARY EMBODIMENTS

Next, exemplary embodiments of the present invention will be described with reference to the drawings.

First Exemplary Embodiment

Figure 1:
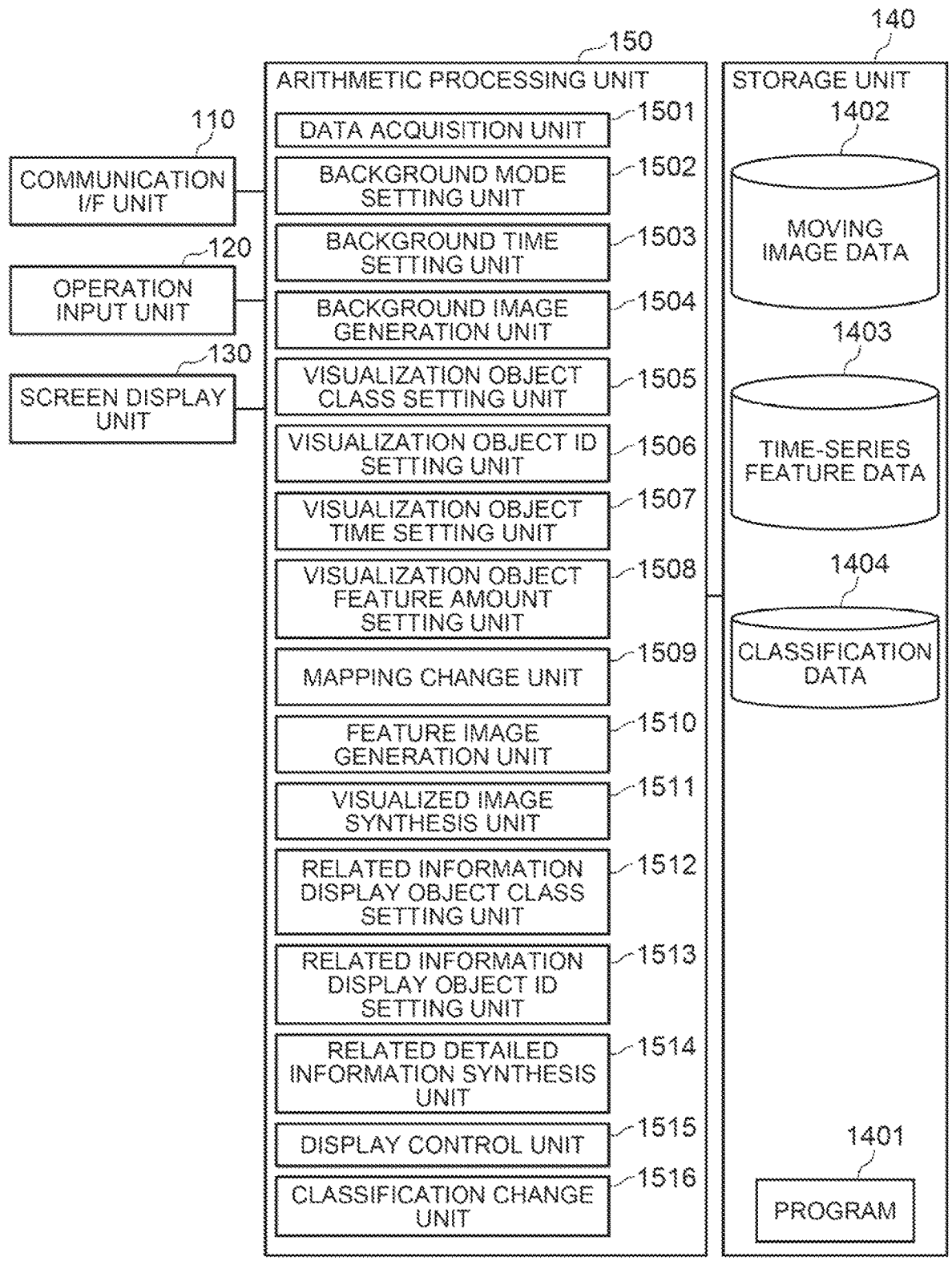
FIG. 1 is a block diagram of a visualized image display device according to a first exemplary embodiment of the present invention.

FIG. 1 is a block diagram of a visualized image display device 100 according to a first exemplary embodiment of the present invention. The visualized image display device 100 of the present embodiment is an information processing device configured to visualize a time-series change of a feature of an object in a video.

The visualized image display device 100 includes, as main components, a communication interface unit (hereinafter referred to as a communication I/F unit) 110, an operation input unit 120, a screen display unit 130, a storage unit 140, and an arithmetic processing unit 150.

The communication I/F unit 110 is configured of a dedicated data communication circuit, and is configured to perform data communication with various types of devices connected over a wireless network or the like. The operation input unit 120 is configured of operation input devices such as a keyboard and a mouse, and is configured to detect operation by an operator and output it to the arithmetic processing unit 150. The screen display unit 130 is configured of a screen display device such as a liquid crystal display (LCD) or a plasma display panel (PDP), and is configured to display, on a screen, various types of information such as images and text according to an instruction from the arithmetic processing unit 150. The operation input unit 120 and the screen display unit 130 also function as a graphical user interface (GUI) having an interactive means for changing various settings by the user via a screen. Input means of the GUI may have any forms such as a touch panel, a keyboard, a mouse, buttons, and a dial.

The storage unit 140 is configured of storage devices such as a hard disk and a memory, and is configured to store therein processing information and a program 1401 necessary for various types of processing in the arithmetic processing unit 150. The program 1401 is a program for implementing various processing units by being read and executed by the arithmetic processing unit 150, and is read in advance from an external device (not illustrated) or a storage medium (not illustrated) via a data input-output function such as the communication I/F unit 110 and is stored in the storage unit 140. Main processing information stored in the storage unit 140 includes moving image data 1402, time-series feature data 1403, and classification data 1404.

The moving image data 1402 is a moving image sequence data in which an unspecified number of objects appear. The viewing direction of the camera that captures the moving image data 1402 may be fixed or movable. The camera may be a visible light camera or one other than a visible light camera such as an infrared camera. The moving image data 1402 may be a video signal input from the camera on-line or an off-line video that is recorded previously. A frame image constituting the moving image data 1402 is applied with the captured time (hereinafter also simply referred to as the time) or a frame number that uniquely identifies the frame image. Accordingly, by using the time or a frame number as a search keyword, it is possible to search for a frame image of the desired time or frame number from the moving image data 1402.

The time-series feature data 1403 is time-series data of one or more feature amount of an object in the moving image data 1402. The time-series feature data 1403 holds time-series data of the feature amount of an object in the moving image by associating an object ID that uniquely identifies the object, a feature amount ID that uniquely identifies the feature amount time, and the time (or corresponding moving image frame number, this also applied to the below description) with one another. Therefore, by using a set of an object ID, a feature amount ID, and the time as a search keyword, it is possible to search for time-series data, having the desired object ID, feature amount ID, and time, from the time-series feature data 1403. The feature amount type includes position, color, size, shape, and time derivative thereof, of an object acquired by image analysis. However, the feature amount type may not be only the type obtained from a result of image analysis, but also one obtained from device logs linked to the time or information of another sensor (camera orientation, camera parameters such as pan, tilt, and zoom, information synchronized with the time acquired from a sensor other than a camera). Further, the time-series feature data 1403 may be on-line data obtained by analyzing the moving image data 1402 in real time, or may be data analyzed off-line. Further, the time-series feature data 1403 may be data created manually from the moving image data 1402, or data created automatically by the image analysis system from the moving image data 1402.

Figure 2:
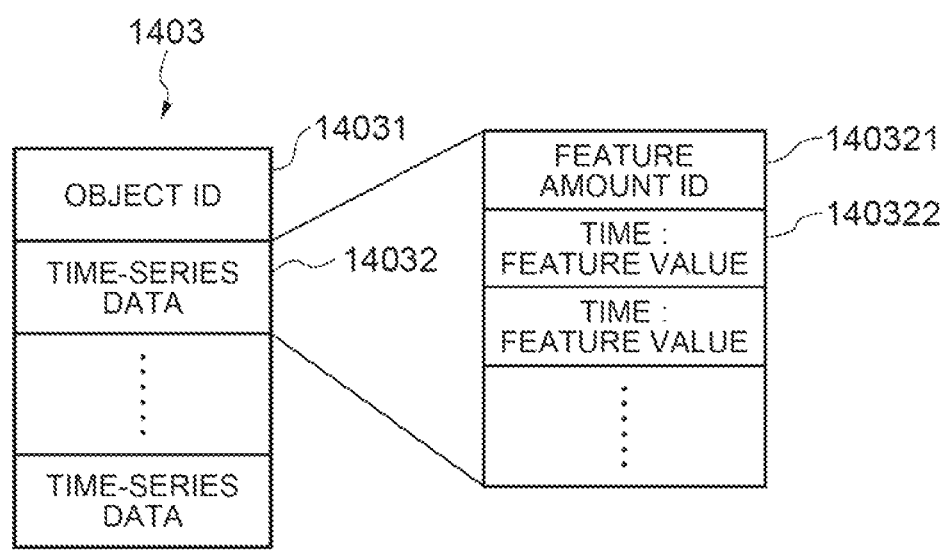
FIG. 2 illustrates an exemplary format of time-series feature data in the first exemplary embodiment of the present invention.

FIG. 2 illustrates an exemplary format of the time-series feature data 1403. The time-series feature data 1403 of this example includes an object ID 14031, and one or more pieces of time-series data 14032 each of which corresponds to a feature amount type one to one. Each piece of time-series data 14032 includes a feature amount ID 140321 that uniquely identifies a feature amount type, and one or more pairs 140322 of the time and a feature value aligned in the time ascending order. A feature value is a numerical value representing the position (x coordinate value, y coordinate value) of an object, a numerical value representing the size, a numerical value representing the color, or the like.

Figure 3:
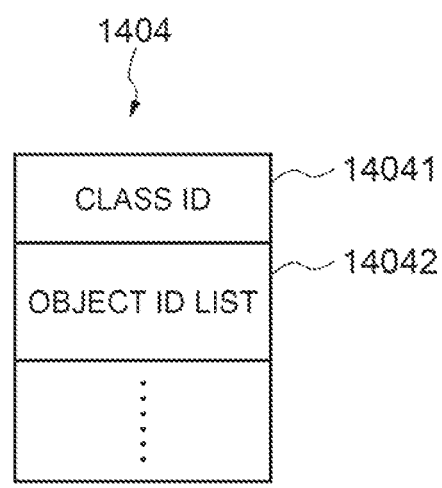
FIG. 3 illustrates an exemplary format of classification data in the first exemplary embodiment of the present invention.

The classification data 1404 is data in which an object ID and a class ID are associated with each other. FIG. 3 illustrates an exemplary format of the classification data 1404. The classification data 1404 of this example includes one or more pairs of a class ID 14041 and an object ID list 14042. The class ID 14041 is a name, a numerical value, or the like that uniquely identifies a class. The object ID list 14042 is a list of object IDs belonging to the class specified by the class ID 14041 of the same pair.

The arithmetic processing unit 150 has a microprocessor such as an MPU and the peripheral circuits thereof, and is configured to read and execute the program 1401 from the storage unit 140 to allow the hardware and the program 1401 to cooperate with each other to thereby implement the various processing units. Main processing units implemented by the arithmetic processing unit 150 include a data acquisition unit 1501, a background mode setting unit 1502, a background time setting unit 1503, a background image generation unit 1504, a visualization object class setting unit 1505, a visualization object ID setting unit 1506, a visualization object time setting unit 1507, a visualization object feature amount setting unit 1508, a mapping change unit 1509, a feature image generation unit 1510, a visualized image synthesis unit 1511, a related information display object class setting unit 1512, a related information display object ID setting unit 1513, a related detailed information synthesis unit 1514, a display control unit 1515, and a classification change unit 1516.

The data acquisition unit 1501 is configured to acquire moving image data and time-series feature data generated from the moving image data from an external device such as an external image analysis device, not shown, via the communication I/F unit 110, and store them as the moving image data 1402 and the time-series feature data 1403 in the storage unit 140. The data acquisition unit 1501 is also configured to acquire classification data from an external device, not shown, via the communication I/F unit 110, and store it as the classification data 1404 in the storage unit 140.

The background mode setting unit 1502, the background time setting unit 1503, and the background image generation unit 1504 are used for setting a background image of a visualized image.

The background mode setting unit 1502 is configured to perform interactive processing with a user via the operation input unit 120 and the screen display unit 130 (hereinafter simply referred to as interactive processing with a user) to thereby set any one of three modes, that is, (1) black image (black background), (2) designated frame fixing, and (3) designated frame reproduction, as the background of a visualized image. However, the background mode setting unit 1502 sets black background (1) in a case other than the case where position information of an object is assigned to (x, y) of a visualized image by the mapping change unit 1509.

The background time setting unit 1503 is configured to, when the background mode (2) is set, set the time (or frame number) of an image to be set to the background through interactive processing with a user. Further, the background time setting unit 1503 is also configured to, when the background mode (3) is set, set the start/end time (or frame number) of an image to be reproduced as the background through interactive processing with a user, and also allow the current play position to be adjustable (time designation, play/pause, and the like).

The background image generation unit 1504 is configured to generate, as a background image, an image (black background or specified frame image) corresponding to the background mode and time set by the background mode setting unit 1502 and the background time setting unit 1503.

The visualization object class setting unit 1505, the visualization object ID setting unit 1506, the visualization object time setting unit 1507, the visualization object feature amount setting unit 1508, the mapping change unit 1509, and the feature image generation unit 1510 are used for setting a feature image in which a temporal change of a feature of an object is visualized.

The visualization object class setting unit 1505 is configured to select one or more or all objects whose time-series features are to be visualized in class units through interactive processing with a user. For example, the visualization object class setting unit 1505 is configured to read out all class IDs from the classification data 1404, display checkboxes corresponding to the respective class IDs on the screen display unit 130, and receive on-off operation performed on the respective checkboxes from the user via the operation input unit 120.

The visualization object ID setting unit 1506 is configured to select one or more or all objects whose time-series features are to be visualized in object ID units through interactive processing with a user. For example, the visualization object ID setting unit 1506 is configured to read out all object IDs from the time-series feature data 1403 or the classification data 1404, display checkboxes corresponding to the respective object IDs on the screen display unit 130, and receive on-off operation performed on the respective checkboxes from the user via the operation input unit 120. Alternatively, the visualization object ID setting unit 1506 may be configured to extract only object IDs belonging to a class set by the visualization object class setting unit 1505 from the classification data 1404, display checkboxes corresponding to the extracted object IDs on the screen display unit 130, and receive on-off operation performed on the respective checkboxes from the user via the operation input unit 120.

The visualization object time setting unit 1507 is configured to set the start/end time (or frame number) of a time-series feature to be visualized through interactive processing with a user. Alternatively, the visualization object time setting unit 1507 is configured to set the start/end time (or frame number) of a time-series feature to be visualized, by using the time length (frame length) from the appear/end time of an object ID selected by the user, through interactive processing with a user. However, the time length (frame length) may be automatically set as an initial value according to the appear/end time of the object ID.

The visualization object feature amount setting unit 1508 is configured to set the type of a feature amount to be visualized in the time-series feature data through interactive processing with a user. For example, the visualization object feature amount setting unit 1508 may be configured to read out all feature amount IDs from the time-series feature data 1403, display checkboxes corresponding to the respective feature amount IDs on the screen display unit 130, and receive on-off operation performed on the respective checkboxes from the user via the operation input unit 120.

The mapping change unit 1509 is configured to set variables to be assigned to the horizontal axis (x axis) and the vertical axis (y axis) (in the case of a three-dimensional coordinate, also z axis) of a coordinate plane on which a visualized image is shown, through interactive processing with a user. Here, variables include a feature amount type, the elapsed time, a class, and an object. For example, the mapping change unit 1509 is configured to display, on the screen display unit 130, a dropdown list corresponding to the horizontal axis (x axis) and the vertical axis (y axis) one to one, and receive an operation to select one variable from a list of variables via each dropdown list from a user via the operation input unit 120.

The mapping change unit 1509 is also configured to set variables to be assigned to hue (H), saturation (S), lightness (V), and transmittance (alpha) of the display elements (locus and the like) to be shown on the coordinate plane through interactive processing with a user. For example, the mapping change unit 1509 is configured to display, on the screen display unit 130, a dropdown list corresponding to each of hue (H), saturation (S), lightness (V), and transmittance (alpha) one to one, and receive an operation to select one variable from a list of variables via each dropdown list from a user via the operation input unit 120.

The mapping change unit 1509 may also be configured to set a correspondence curve of an x axis, a y axis, a z axis, hue (H), saturation (S), lightness (V), and transmittance (alpha) and variables to be assigned thereto, through interactive processing with a user. The mapping change unit 1509 is also configured to set a display value range of hue (H), saturation (S), lightness (V), and transmittance (alpha) of the display elements (locus and the like) through interactive processing with a user. Further, hue (H), saturation (S), lightness (V), and transmittance (alpha) of display elements to which no variable is assigned may have fixed values, and the mapping change unit 1509 may be configured to change the values through interactive processing with a user.

The feature image generation unit 1510 is configured to generate a feature image in which time-series feature data is visualized, on the basis of conditions set by the visualization object class setting unit 1505, the visualization object ID setting unit 1506, the visualization object time setting unit 1507, the visualization object feature amount setting unit 1508, and the mapping change unit 1509.

Specifically, the feature image generation unit 1510 first extracts, from the time-series feature data 1403, time-series feature data satisfying the class ID, the object ID, the feature amount type, and the start/end time set by the visualization object class setting unit 1505, the visualization object ID setting unit 1506, the visualization object time setting unit 1507, and the visualization object feature amount setting unit 1508. For example, it is assumed that class ID=C1 is selected in the visualization object class setting unit 1505, object IDs=01, 02 belonging to the class C1 are selected in the visualization object ID setting unit 1506, feature amount IDs=F1, F2 are selected in the visualization object feature amount setting unit 1508, and the start time=Ts and the end time=Te are selected in the visualization object time setting unit 1507. In that case, the feature image generation unit 1510 searches for the time-series feature data 1403 by using, for example, a combination of the object ID=01 or 02, the feature amount ID=F1 or F2, and Ts≤time≤Te as keywords, and extracts time-series data 14032 having the feature amount ID=F1 or F2 from the time-series data 1403 having the object ID=01 or 02, and acquires a pair 140322 of the time and a feature value including the time satisfying Ts≤time≤Te from the extracted time-series data 14032.

Then, the feature image generation unit 1510 generates display data to be displayed on the coordinate plane on the basis of the extracted time-series feature data and the variables assigned to the x axis (horizontal axis) and the y axis (vertical axis) of the coordinate plane and to the display elements by the mapping change unit 1509. For example, in the mapping change unit 1509, it is assumed that the feature amount ID=F1 is assigned to the horizontal axis (x axis), the feature amount ID=F2 is assigned to the vertical axis (y axis), the elapsed time is assigned to the hue (H), and fixed values are assigned to the saturation (S), lightness (V), and transmittance (alpha), respectively. In that case, the feature image generation unit 1510 generates display data for displaying, on the coordinate plane, a display element indicating a relationship between the time-series data according to the feature amount ID=F1 assigned to the horizontal axis (x axis) and the time-series data according to the feature amount ID=F2 assigned to the vertical axis (y axis). Further, the feature image generation unit 1510 controls the hue (H) of the display element according to the lapse of time in the time-series data, on the basis of the elapsed time that is a variable assigned to the hue (H). Thereby, when the feature amount ID=F1 is an x coordinate value of the object and the feature amount ID=F2 is a y coordinate value of the object for example, display data for displaying a moving locus representing a temporal change of the position of the object on the coordinate plane is generated.

The visualized image synthesis unit 1511 is configured to generate, as a visualized image, an image in which a feature image generated by the feature image generation unit 1510 is superimposed on a background image generated by the background image generation unit 1504.

The related information display object class setting unit 1512, the related information display object ID setting unit 1513, and the related detailed information synthesis unit 1514 are used for setting information (related information) to be displayed related to the class or the object. For example, related information includes basic information (object ID, class ID, appearance/disappearance frame, and the like) of an object. Alternatively, related information may be basic information and visualized image ID/class and a visualized image of an object having similar features, feature amount statistic information (visualized image of an average value, histogram, and the like) of a designated class, and the like.

The related information display object class setting unit 1512 is configured to set a class ID of an object for which related information is to be displayed, through interactive processing with a user. The related information display object ID setting unit 1513 is configured to set an object ID of an object for which related information is to be displayed, through interactive processing with a user. For example, the related information display object class setting unit 1512 and the related information display object ID setting unit 1513 may be configured to determine that a class ID to which the object belongs and an object ID are designated when a display element (locus or the like) of the object in the visualized image is clicked by a user.

The related detailed information synthesis unit 1514 is configured to extract, from the time-series feature data 1403 and the classification data 1404, related information of a class and an object satisfying the class ID and the object ID set by the related information display object class setting unit 1512 and the related information display object ID setting unit 1513. The related detailed information synthesis unit 1514 is configured to generate a related information image for displaying the extracted related information in a different area or a different window from a visualized image.

The display control unit 1515 is configured to display a visualized image, generated by the visualized image synthesis unit 1511, on the screen display unit 130. The display control unit 1515 is also configured to display a related information image, generated by the related detailed information synthesis unit 1514, on the screen display unit 130.

The classification change unit 1516 is configured to correct the classification data 1404 through interactive processing with a user. For example, the classification change unit 1516 is configured to move an object ID stored in an object ID list 14042 of a class ID 14041 of the classification data 1404 illustrated in FIG. 3, to an object ID list 14042 of another class ID 14041, to thereby correct the class to which the object belongs, through interactive processing with a user.

Figure 4:
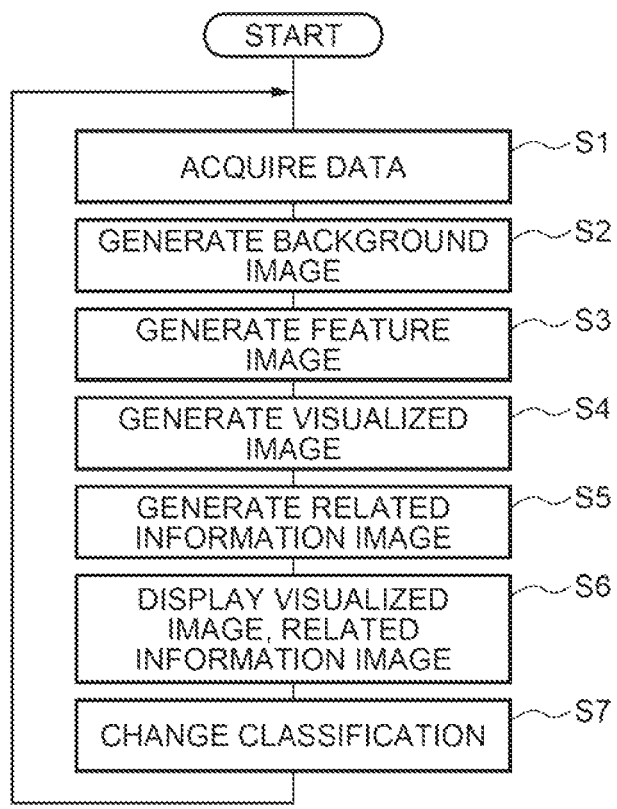
FIG. 4 is a flowchart of an exemplary operation of the visualized image display device according to the first exemplary embodiment of the present invention.

Next, operation of the visualized image display device 100 will be described. FIG. 4 is a flowchart showing an exemplary operation of the visualized image display device 100.

With reference to FIG. 4, first, the data acquisition unit 1501 acquires the moving image data 1402, the time-series feature data 1403, and the classification data 1404 from an external device, not shown, via the communication I/F unit 110, and stores them in the storage unit 140 (step S1).

Then, the background mode setting unit 1502, the background time setting unit 1503, and the background image generation unit 1504 generate a background image of a visualized image through interactive processing with the user (step S2).

Then, the visualization object class setting unit 1505, the visualization object ID setting unit 1506, the visualization object time setting unit 1507, the visualization object feature amount setting unit 1508, the mapping change unit 1509, and the feature image generation unit 1510 generate a feature image in which a temporal change of a feature of an object is visualized, through interactive processing with the user (step S3).

Then, the visualized image synthesis unit 1511 generates, as a visualized image, an image in which a feature image generated by the feature image generation unit 1510 is superimposed on the background image generated by the background image generation unit 1504 (step S4).

Then, the related information display object class setting unit 1512, the related information display object ID setting unit 1513, and the related detailed information synthesis unit 1514 generate a related information image for displaying information (related information) to be displayed related to the object on a different area or a different window from the visualized image, through interactive processing with the user (step S5).

Then, the display control unit 1515 displays, on the screen display unit 130, the visualized image generated by the visualized image synthesis unit 1511 and the related information image generated by the related detailed information synthesis unit 1514 (step S6).

Then, the classification change unit 1516 corrects the classification data 1404 through interactive processing with the user (step S7). Then, the visualized image display device 100 returns to step S51 and repeats the same processing as that described above.

Next, an example of the present invention will be described.

As the moving image data 1402, a video obtained by stirring a transparent or translucent liquid in a container and capturing the motion of an unspecified number of fine objects present in the liquid was used. As objects in the video, three types of objects, that is, foreign articles (dust and the like) contaminated in the liquid, bubbles, and fine scratches on the surface of the container, were used. Further, moving image data captured when the container was in a stationary state and moving image data captured when the container was in a rotated state were prepared.

As the time-series feature data 1403, time-series data of positions of the respective objects (foreign articles, bubbles, scratches) present in the moving image data was used. The position of each object was represented by an x coordinate value and a y coordinate value on the XY coordinate axis set on the image.

As the classification data 1404, data obtained by classifying respective objects, appearing on each frame image of the moving image data 1402, into any of a foreign article class, a bubble class, and a scratch class by a human manual operation was used.

Figure 5:
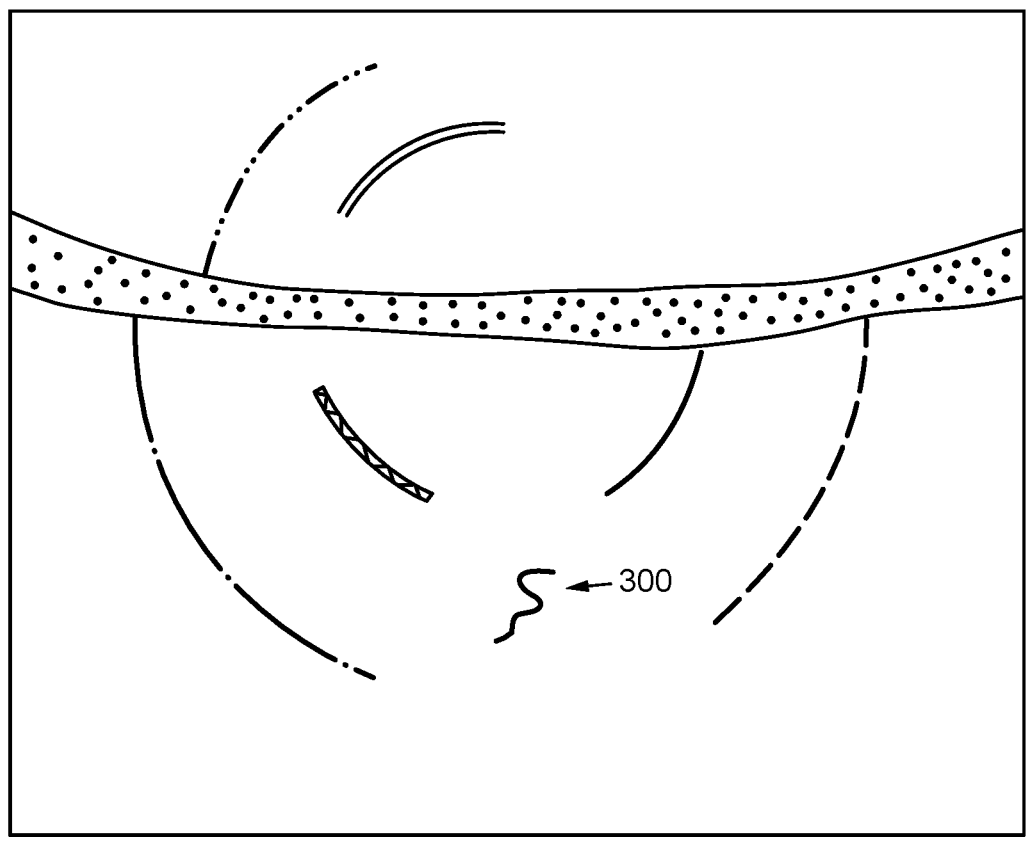
FIG. 5 illustrates an example of a visualized image according to the first exemplary embodiment of the present invention.

FIG. 5 is a schematic diagram illustrating an example of a visualized image displayed on the screen display unit 130. In the visualized image of this example, a frame image in a certain period of the moving image data 1402 is used as a background image. Further, as a feature image, a locus representing a temporal change of the position of an object belonging to a scratch class is used. Further, an object ID is assigned to the color of the locus, so that the object ID is distinguished according to the color. In FIG. 5, a color difference is expressed by the type of locus for convenience of explanation. The used moving image data and time-series feature data are moving image data captured when the container is in the rotated state and time-series feature data generated therefrom. The hatched portion in the figure corresponds to a liquid surface portion. It can be found that almost all of the objects shown in FIG. 5 are in an arc shape about the center of rotation of the container, and move in synchronization with the rotation of the container. However, an object 300 in FIG. 5 obviously differs from the loci of other objects, and is asynchronous to the rotation of the container. If the object 300 is a scratch on the container, it must move in synchronization with the rotation of the container, but the object 300 does not move in such a way. Accordingly, it is considered that the object 300 is not a scratch on the container but a foreign article or a bubble. That is, it is considered that a scratch label is erroneously applied to the object 300. In that case, the user can correct the label of the object X by using the classification change unit 1516.

Figure 6:
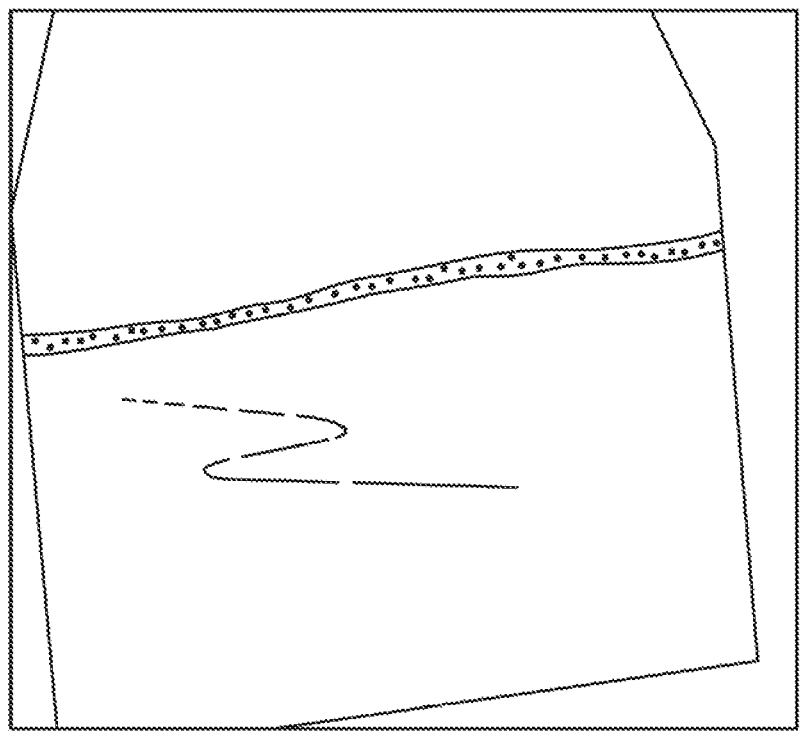
FIG. 6 illustrates an example of another visualized image according to the first exemplary embodiment of the present invention.

FIG. 6 illustrates another example of a visualized image displayed on the screen display unit 130. In the visualized image of this example, a specific frame image of the moving image data 1402 is used as a background image. Further, as a feature image, a locus representing a temporal change of the position of a specific object belonging to a foreign article class is used. Further, the lapse of time is assigned to the hue of the locus, so that the time is expressed by the hue. In FIG. 6, a hue difference is expressed by the line type of the locus for convenience of explanation. The used moving image data and time-series feature data are moving image data captured when the container is in a stationary state and time-series feature data generated therefrom. With the visualized image shown in FIG. 6, it is possible to check how a specific foreign article temporarily moves, individually.

Figure 7:
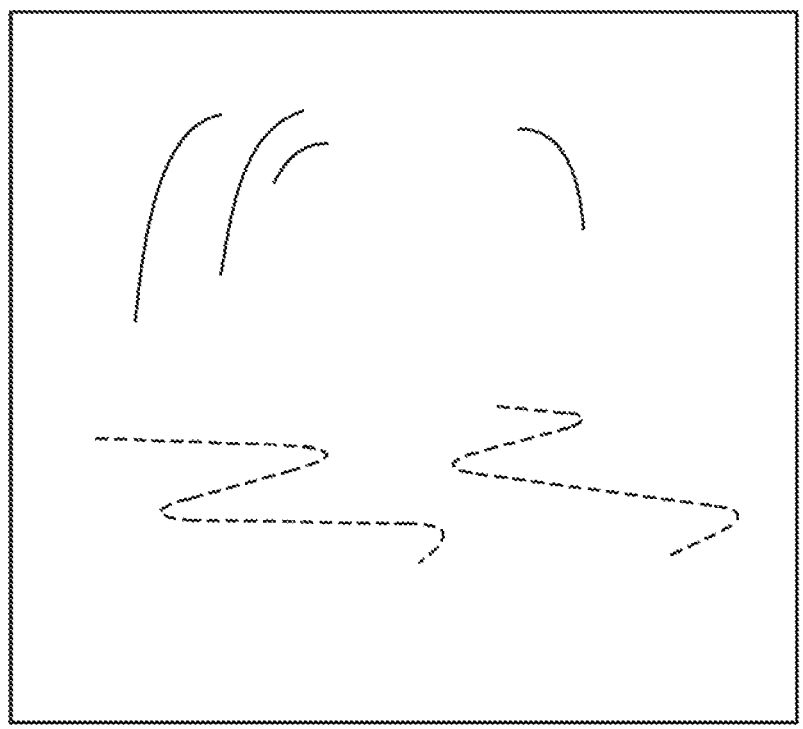
FIG. 7 illustrates an example of still another visualized image according to the first exemplary embodiment of the present invention.

FIG. 7 illustrates another example of a visualized image displayed on the screen display unit 130. In the visualized image of this example, a black background is used (in the drawing, white background is used for convenience of explanation) as a background image. Further, as a feature image, loci representing temporal changes of the positions of all objects are used. Further, a class is assigned to the hue of the locus, so that a class is expressed by the hue. In FIG. 7, a hue difference is expressed by the line type of the locus for convenience of explanation. With the visualized image shown in FIG. 7, temporal changes of the positions of the objects can be compared between classes.

FIGS. 5 to 7 illustrate images in which loci representing temporal changes of the positions of objects are visualized. However, it is also possible to visualize another feature amount of course, without being limited to locus information. For example, by assigning the time to the x axis and assigning a feature amount A to the y axis, it is possible to show a time-series graph of the feature amount A as a visualized image. Further, by assigning the feature amount A to the x axis and assigning a feature amount B to the y axis, it is possible to show a correlation diagram between the feature amount A and the feature amount B as a visualized image.

As described above, according to the present embodiment, it is possible to visually check a temporal change of a feature of an object in the video for each object class. This is because the present embodiment includes the data acquisition unit 1501 that acquires the time-series feature data 1403 in which time-series data of a feature of an object in a video and an object ID are associated with each other and acquires the classification data 1404 in which the object ID and a class ID that is labeled to the object are associated with each other, the visualization object class setting unit 1505 that sets a class ID to be visualized, and the feature image generation unit 1510 that acquires the object ID associated with the set class ID from the classification data 1404, acquires the time-series data associated with the acquired object ID from the time-series feature data 1403, and on the basis of the acquired time-series data, creates a feature image representing a temporal change of the feature of the object having the selected class ID.

Further, according to the present embodiment, since the visualization object ID setting unit 1506 is provided, it is possible to visually check a temporal change of a feature of an object in the video for each object.

Further, according to the present embodiment, since the visualization object time setting unit 1507 is provided, it is possible to visually check a temporal change of a feature of an object in the video while limiting to a desired period of time.

Further, according to the present embodiment, since the visualization object feature amount setting unit 1508 is provided, it is possible to visually check a temporal change of a feature of an object in the video for each feature type.

Further, according to the present embodiment, since the mapping change unit 1509 is provided, the way of showing a temporal change of a feature of an object in the video is not limited to a specific one but can be changed variously.

Further, according to the present embodiment, since the background mode setting unit 1502 and the background time setting unit 1503 are provided, a background image of a visualized image can be freely set from a frame image of moving image data and a black background.

Further, according to the present embodiment, since the related detailed information synthesis unit 1514 that generates a related information image for showing related information in a different area or a different window from a visualized image, it is possible to display to the user related information of a class or an object in which a temporal change of a feature is visualized.

Further, according to the present embodiment, since the classification change unit 1516 is provided, when it is found by a visualized image that labeling of an object is wrong, it is possible to correct the classification data 1404 at that time.

Second Exemplary Embodiment

Figure 8:
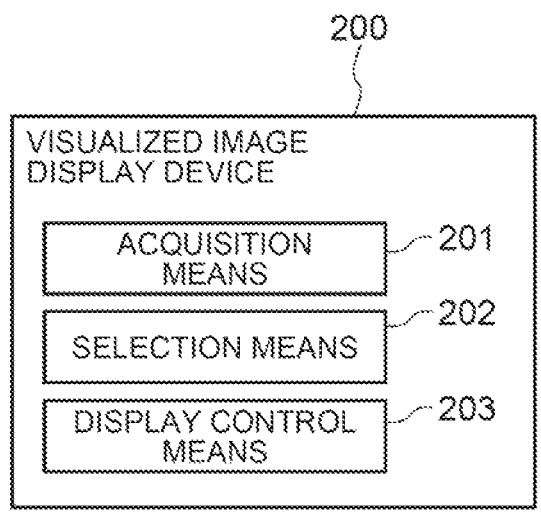
FIG. 8 is a block diagram of a visualized image display device according to a second exemplary embodiment of the present invention.

Next, a second exemplary embodiment of the present invention will be described. FIG. 8 is a block diagram of a visualized image display device 200 according to the present embodiment.

Referring to FIG. 8, the visualized image display device 200 includes an acquisition means 201, a selection means 202, and a display control means 203.

The acquisition means 201 is configured to acquire time-series feature data in which time-series data of a feature of an object in a video and an object ID are associated with each other, and classification data in which the object ID and a class ID labeled to the object are associated with each other. The acquisition means 201 may be configured similarly to the data acquisition unit 1501 of FIG. 1 for example, but is not limited thereto.

The selection means 202 is configured to select a class ID to be visualized. The selection means 202 may be configured similarly to the visualization object class setting unit 1505 of FIG. 1 for example, but is not limited thereto.

The display control means 203 is configured to acquire an object ID associated with the class ID selected by the selection means 202, from the classification data acquired by the acquisition means 201. The display control means 203 is also configured to acquire the time-series data associated with the acquired object ID, from the time-series feature data acquired by the acquisition means 201. The display control means 203 is also configured to display, on a display unit, a feature image representing a temporal change of a feature of the object having the selected class ID, on the basis of the acquired time-series data. The display control means 203 may be configured similarly to the feature image generation unit 1510 and the display control unit 1515 of FIG. 1 for example, but is not limited thereto.

The visualized image display device 200 configured as described above operates as described below. First, the acquisition means 201 acquires time-series feature data in which time-series data of a feature of an object in a video and an object ID are associated with each other, and classification data in which an object ID and a class ID labeled to the object are associated with each other. Then, the selection means 202 selects a class ID to be visualized. Then, the display control means 203 acquires an object ID associated with the selected class ID from the classification data, acquires time-series data associated with the acquired object ID from the time-series feature data, and on the basis of the acquired time-series data, displays a feature image representing a temporal change of a feature of the object having the selected class ID on the display unit.

As described above, according to the present embodiment, it is possible to visually check a temporal change of a feature of an object in the video for each object class. This is because the present embodiment includes the acquisition means 201 that acquires time-series feature data in which time-series data of a feature of an object in a video and an object ID are associated with each other and acquires classification data in which an object ID and a class ID that is labeled to the object are associated with each other, the selection means 202 that selects a class ID to be visualized, and the display control means 203 that acquires an object ID associated with the selected class ID from the classification data, acquires time-series data associated with the acquired object ID from the time-series feature data, and on the basis of the acquired time-series data, displays a feature image representing a temporal change of a feature of the object having the selected class ID on the display unit.

While the present invention has been described with reference to the exemplary embodiments described above, the present invention is not limited to the above-described embodiments. The form and details of the present invention can be changed within the scope of the present invention in various manners that can be understood by those skilled in the art. For example, in the case of displaying a locus image of an object, the object may be highlighted by extending the dynamic range of an area surrounding the object in each frame image.

INDUSTRIAL APPLICABILITY

The present invention is applicable to a consideration assisting tool (tool for considering which feature amount is useful, whether directivity of an algorithm is appropriate, and the like) in development of an object tracking and analysis technology using a camera moving image. In particular, according to the present invention, by realizing visualization by superimposing appropriate information on one image or a moving image, it is possible to present a time-series feature of an object in an understandable manner. As a result, checking and comparison of behavior for each class or each object can be performed easily, and a time-series feature unique to each class or each object can be found easily.

Further, the present invention is applicable to a visualization tool for checking and verifying an output result of an analysis system (test machine, monitoring device, or the like) using a camera moving image. The present invention is also applicable to assistance of visual checking of an object in an operation of applying a correct answer to data for analysis.

The whole or part of the exemplary embodiments disclosed above can be described as, but not limited to, the following supplementary notes.

(Supplementary Note 1)

A visualized image display device comprising:
acquisition means for acquiring time-series feature data in which time-series data of a feature of an object in a video and an object ID are associated with each other, and classification data in which the object ID and a class ID labeled to the object are associated with each other;
selection means for selecting a class ID to be visualized; and
display control means for acquiring the object ID associated with the selected class ID from the classification data, acquiring time-series data associated with the acquired object ID from the time-series feature data, and on a basis of the acquired time-series data, displaying a feature image representing a temporal change of the feature of the object having the selected class ID, on a display unit.

(Supplementary Note 2)

The visualized image display device according to supplementary note 1, further comprising
classification change unit for correcting the classification data.

(Supplementary Note 3)

The visualized image display device according to supplementary note 1 or 2, further comprising
background image generation means for generating a specific frame image of the video or a black image as a background image, wherein
the display control means is configured to display a visualized image in which the feature image is superimposed on the background image, on the display unit.

(Supplementary Note 4)

The visualized image display device according to any of supplementary notes 1 to 3, further comprising
related detailed information synthesis means for generating a related information image representing information related to a class according to the class ID or information related to an object according to the object ID, wherein
the display control means is configured to display the related information image in a display area that is different from a display area of the feature image.

(Supplementary Note 5)

The visualized image display device according to any of supplementary notes 1 to 4, further comprising
mapping change means for selecting variables to be assigned to hue (H), saturation (S), lightness (V), and transmittance (alpha) of a display element (locus or the like) shown on a horizontal axis and a vertical axis of a coordinate plane on which the visualized image is shown and on the coordinate plane, from among a feature amount type, elapsed time, a class, and an object.

(Supplementary Note 6)

A visualized image display method comprising:
acquiring time-series feature data in which time-series data of a feature of an object in a video and an object ID are associated with each other, and classification data in which the object ID and a class ID labeled to the object are associated with each other;
selecting a class ID to be visualized; and
acquiring the object ID associated with the selected class ID from the classification data, acquiring time-series data associated with the acquired object ID from the time-series feature data, and on a basis of the acquired time-series data, displaying a feature image representing a temporal change of the feature of the object having the selected class ID, on a display unit.

(Supplementary Note 7)

The visualized image display method according to supplementary note 6, further comprising correcting the classification data.

(Supplementary Note 8)

The visualized image display method according to supplementary note 6 or 7, further comprising
generating a specific frame image of the video or a black image as a background image, wherein
the displaying includes displaying a visualized image in which the feature image is superimposed on the background image, on the display unit.

(Supplementary Note 9)

The visualized image display method according to any of supplementary notes 6 to 8, further comprising
generating a related information image representing information related to a class according to the class ID or information related to an object according to the object ID, wherein
the displaying includes displaying the related information image in a display area that is different from a display area of the feature image.

(Supplementary Note 10)

A computer-readable storage medium storing thereon a program for causing a computer to execute processing to:
acquire time-series feature data in which time-series data of a feature of an object in a video and an object ID are associated with each other, and classification data in which the object ID and a class ID labeled to the object are associated with each other;
select a class ID to be visualized; and
acquire the object ID associated with the selected class ID from the classification data, acquire time-series data associated with the acquired object ID from the time-series feature data, and on a basis of the acquired time-series data, display a feature image representing a temporal change of the feature of the object having the selected class ID, on a display unit.

REFERENCE SIGNS LIST 100 visualized image display device
110 communication I/F unit
120 operation input unit
130 screen display unit
140 storage unit
150 arithmetic processing unit
200 visualized image display device
201 acquisition means
202 selection means
203 display control means
1401 program
1402 moving image data
1403 time-series feature data 1404 classification data
1501 data acquisition unit
1502 background mode setting unit
1503 background time setting unit
1504 background image generation unit
1505 visualization object class setting unit
1506 visualization object ID setting unit
1507 visualization object time setting unit
1508 visualization object feature amount setting unit
1509 mapping change unit
1510 feature image generation unit
1511 visualized image synthesis unit
1512 related information display object class setting unit
1513 related information display object ID setting unit
1514 related detailed information synthesis unit
1515 display control unit
1516 classification change unit

What is claimed is:

1. A visualized image display device comprising:
a memory containing program instructions; and
a processor coupled to the memory, wherein the processor is configured to execute the program instructions to:
acquire time-series feature data in which time-series data of a feature of an object in a video and an object ID are associated with each other, and classification data in which the object ID and a class ID labeled to the object are associated with each other;
select a class ID to be visualized;
acquire the object ID associated with the selected class ID from the classification data, acquire time-series data associated with the acquired object ID from the time-series feature data, and on a basis of the acquired time-series data, display a feature image representing a temporal change of the feature of the object having the selected class ID, on a display device; and
select variables from among a feature amount type, elapsed time, a class, and an object, the selected variables to be assigned to hue (H), saturation (S), lightness (V), and transmittance (alpha) of a display element shown on a horizontal axis and a vertical axis of a coordinate plane on which a visualized image is shown, wherein the variables to be selected are shown on the coordinate plane.

2. The visualized image display device according to claim 1, wherein the processor is further configured to execute the instructions to
correct the classification data.

3. The visualized image display device according to claim 1, wherein the processor is further configured to execute the instructions to
generate a specific frame image of the video or a black image as a background image, wherein
the displaying includes displaying the visualized image in which the feature image is superimposed on the background image, on the display device.

4. The visualized image display device according to claim 1, wherein the processor is further configured to execute the instructions to
generate a related information image representing information related to a class according to the class ID or information related to an object according to the object ID, wherein
the displaying includes displaying the related information image in a display area that is different from a display area of the feature image.

5. A visualized image display method comprising:
acquiring time-series feature data in which time-series data of a feature of an object in a video and an object ID are associated with each other, and classification data in which the object ID and a class ID labeled to the object are associated with each other;
selecting a class ID to be visualized;
acquiring the object ID associated with the selected class ID from the classification data, acquiring time-series data associated with the acquired object ID from the time-series feature data, and on a basis of the acquired time-series data, displaying a feature image representing a temporal change of the feature of the object having the selected class ID, on a display device; and
selecting variables from among a feature amount type, elapsed time, a class, and an object, the selected variables to be assigned to hue (H), saturation (S), lightness (V), and transmittance (alpha) of a display element shown on a horizontal axis and a vertical axis of a coordinate plane on which a visualized image is shown, wherein the variables to be selected are shown on the coordinate plane.

6. The visualized image display method according to claim 5, further comprising
correcting the classification data.

7. The visualized image display method according to claim 5, further comprising
generating a specific frame image of the video or a black image as a background image, wherein
the displaying includes displaying the visualized image in which the feature image is superimposed on the background image, on the display device.

8. The visualized image display method according to claim 5, further comprising
generating a related information image representing information related to a class according to the class ID or information related to an object according to the object ID, wherein
the displaying includes displaying the related information image in a display area that is different from a display area of the feature image.

9. A non-transitory computer-readable storage medium storing thereon a program comprising instructions for causing a computer to execute processing to:
acquire time-series feature data in which time-series data of a feature of an object in a video and an object ID are associated with each other, and classification data in which the object ID and a class ID labeled to the object are associated with each other;
select a class ID to be visualized;
acquire the object ID associated with the selected class ID from the classification data, acquire time-series data associated with the acquired object ID from the time-series feature data, and on a basis of the acquired time-series data, display a feature image representing a temporal change of the feature of the object having the selected class ID, on a display device; and
select variables from among a feature amount type, elapsed time, a class, and an object, the selected variables to be assigned to hue (H), saturation (S), lightness (V), and transmittance (alpha) of a display element shown on a horizontal axis and a vertical axis of a coordinate plane on which a visualized image is shown, wherein the variables to be selected are shown on the coordinate plane.

10. The visualized image display device according to claim 1, wherein the display element is a locus or the like.

11. The visualized image display method according to claim 5, wherein the display element is a locus or the like.

12. The non-transitory computer-readable storage medium according to claim 9, wherein the display element is a locus or the like.

\* \* \* \* \*